(12) United States Patent
Siebens

(10) Patent No.: US 7,915,530 B2
(45) Date of Patent: Mar. 29, 2011

(54) TORQUE LIMITING DEVICE FOR INSULATED PLUG

(75) Inventor: Larry Siebens, Asbury, NJ (US)

(73) Assignee: Thomas & Betts Corporation, Wilmington, DE (US)

(*) Notice: Subject to any disclaimer, the term of this patent is extended or adjusted under 35 U.S.C. 154(b) by 372 days.

(21) Appl. No.: 12/060,422

(22) Filed: Apr. 1, 2008

(65) Prior Publication Data

US 2009/0245965 A1    Oct. 1, 2009

(51) Int. Cl.
  *H01R 4/00* (2006.01)
(52) U.S. Cl. ................... 174/74 R; 174/74 A
(58) Field of Classification Search ........ 174/FOR. 101, 174/74 R, 74 A, 77 R, 77 S
  See application file for complete search history.

(56) References Cited

U.S. PATENT DOCUMENTS

| | | | |
|---|---|---|---|
| 3,174,383 A | 3/1965 | Heil | |
| 3,331,267 A * | 7/1967 | Tietge | 81/471 |
| 3,816,817 A | 6/1974 | Ball et al. | |
| 3,978,761 A | 9/1976 | Sosinski | |
| 4,159,667 A * | 7/1979 | Nordstrom | 411/7 |
| 4,202,591 A | 5/1980 | Borgstrom | |
| 4,215,600 A * | 8/1980 | Kesselman | 81/471 |
| 5,630,737 A | 5/1997 | Dupont | |
| 6,209,424 B1 | 4/2001 | Croton et al. | |
| 6,321,624 B1 | 11/2001 | Croton et al. | |
| 6,439,086 B1 * | 8/2002 | Bahr | 81/467 |

FOREIGN PATENT DOCUMENTS

| | | |
|---|---|---|
| EP | 0655805 A1 | 5/1995 |
| EP | 0698942 A1 | 2/1996 |
| EP | 1161778 | 8/2000 |
| FR | 2503807 | 10/1982 |
| JP | 58172330 | 10/1983 |
| JP | 0660062 | 3/1994 |

* cited by examiner

*Primary Examiner* — William H Mayo, III
(74) *Attorney, Agent, or Firm* — Hoffmann & Baron, LLP

(57) ABSTRACT

An insulated plug for use in a high voltage device includes a torque limiting bolt, including a first hex element, a second hex element, and a shearable shaft element. Alternatively, an insulated plug assembly for use in a high voltage device includes an insulated plug having a torque limiting bolt, where the torque limiting bolt includes a first hex element attached to the insulated plug and a second hex element attached to the first bolt head via a shearable connector, the assembly further including a separate BIP cap.

9 Claims, 5 Drawing Sheets

TORQUE LIMITING DEVICE FOR INSULATED PLUG

FIELD OF THE INVENTION

The present invention is directed to insulated plugs for use in a high voltage device including a torque limiting bolt, which includes a first hex element, a second hex element, and a shearable shaft element.

BACKGROUND OF THE INVENTION

Loadbreak connectors used in conjunction with high voltage switchgears generally include a power cable elbow connector having one opening adapted for receiving a power cable and another opening adapted for receiving a loadbreak bushing insert. Typically, opposite the bushing is an insulated plug. In one typical design, the power cable elbow connector forms a T shape with the bushing and insulated plug meeting at the intersection of the cable.

Generally, insulated plugs require the use of a drive hex, located on the non-threaded part of the plug to fully secure the plug into an elbow. Traditional insulated plug systems are threaded into the elbow by application of an appropriate amount of torque to the drive hex. Too much torque applied to the hex may result in over-stressing the threaded insulated plug, and thus may possibly damage the joint. Such over-stressing may result in failure of the joint. Too little torque applied to the hex may result in the insulated plug assembly being unsecured, rendering it highly susceptible to failure.

In current systems, the insertion of the insulated plug is achieved by rotating the hex either with a standard wrench, with an unknown torque being applied, or through the use of a torque wrench, which helps provide the accurate level of desired torque. Unfortunately, very few utilities carry torque wrenches in their trucks, so installation with a torque wrench becomes quite rare. Thus, users generally attempt to secure the plug with a standard wrench, simply guessing at the level of torque applied, which may result in failure of the joint as explained above.

SUMMARY OF THE INVENTION

In one embodiment of the invention, there is provided an insulated plug assembly for use in a high voltage device including an insulated plug body having an end extent, a first hex element attached to the insulated plug and a second hex element extending from the first hex element, where the second hex element is removably sharable from the first hex element upon exertion of torque in excess of a given value, further including a separate cap seatably attached to the plug body and covering the end extent upon removal of the second hex element.

DETAILED DESCRIPTION OF THE INVENTION

Figure 1:
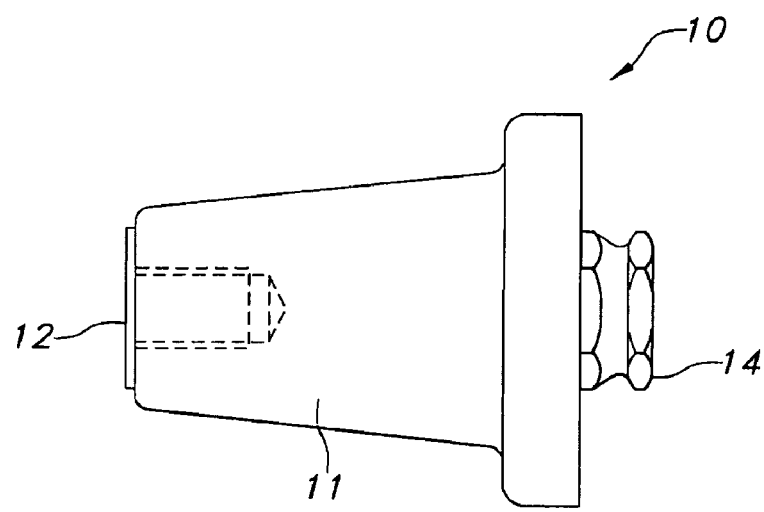
FIG. 1 is a drawing of a standard insulated plug of the prior art.

Referring to FIG. 1, a basic insulating plug (BIP) as found in the prior art is shown. As can be seen, the insulated plug 10 includes an insulated body 11, which incorporates an opening 12 for insertion of the threaded insert of a transformer bushing. Traditionally, the insulated plug 10 is attached to a transformer bushing via insertion of both into a power cable elbow connector (or "joint elbow"), where the insulated plug 10 and the transformer bushing are attached to a power cable. The insulated plug 10 is typically threaded into the joint elbow, but other attachment means may be used if desired. The user typically threads the insulated plug 10 via exerting a level of torque on a hex-shaped nut 14, which is attached on the insulated plug 10. Typically, the hex-shaped nut 14 is attached to the opposite end of the insulated plug 10 from where the insulated plug 10 will be inserted into the joint elbow.

Figure 2:
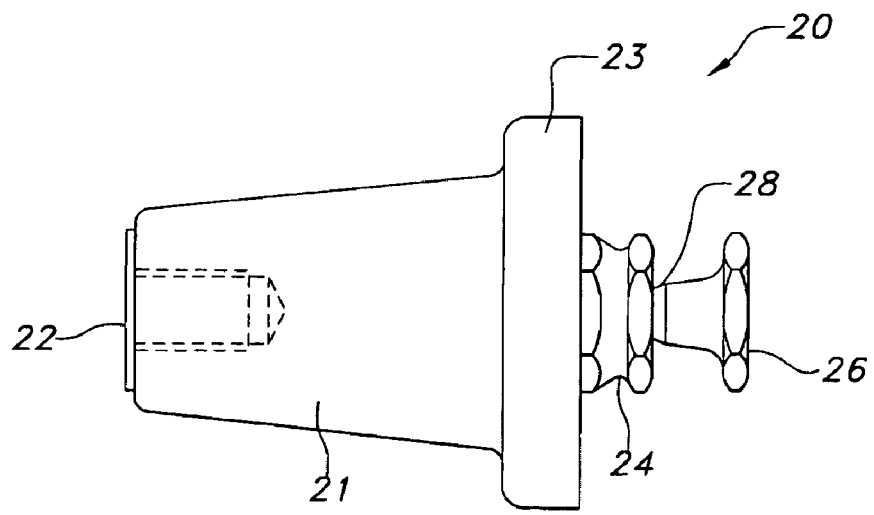
FIG. 2 is a drawing of the insulated plug of the present invention.

FIG. 2 depicts the insulated plug 20 of the present invention, which allows for a precise level of torque to be applied to the insulated plug 20 when it is attached to the transformer bushing at a cable elbow. The insulated plug 20 of the present invention may be used in various applications, including for use in high voltage devices, low voltage devices, and other types of cable systems. The insulated plug 20 includes an insulated body 21 having an opening 22 for insertion of a bushing insert. The opening 22 may be threaded for attachment of the bushing insert. In a preferred embodiment, the opening 22 is located at the point in which the insulated plug 20 may be inserted into a joint elbow. The insulated plug 20 and the joint elbow may be threaded such that the insulated plug 20 is attached to the joint elbow. At the end opposite the opening 22 is a generally cylindrical end extent 23, which preferably has a larger cross section than the body 21.

Preferably, insulated plug 20 includes a torque bolt system for proper attachment into a joint elbow. The torque bolt system is attached to the top of the insulated plug 20, extending away from the end extent 23. The torque bolt system includes first attached hex nut 24 and a second, removable hex nut 26. The first hex nut 24 is preferably a drive hex having a hex-shaped head, the first hex nut 24 being attached to the insulated plug 20 such that it cannot easily be removed from insulated plug 20. The second hex nut 26 preferably includes a hex-shaped head, which may be attached to the top of the first drive hex head of the first hex nut 24. The first hex nut 24 and second hex nut 26 may be made of the same material or they may be different. The first hex nut 24 and/or the second hex nut 26 may be made of any desired material, including plastic, metal, or combinations thereof. The first hex nut 24 and the second hex nut 26 may be the same size or may be different sizes, and they may be the same or different shapes. Preferably, both have hex-shaped heads, but other head shapes may be used if desired. The heads may further include provisions for receiving a screwdriver or other tightening instrument. Also, first hex nut 24 and second hex nut 26 may be rotated with respect to each other such that their respective 'flats' are not in alignment.

The first hex nut 24 and second hex nut 26 are preferably attached to each other through a shearable shaft element 28. The shearable shaft element 28 may be any length or shape desired, and may be made of any desired material, including plastic, metal, or combinations thereof. The shearable shaft element 28 is desirably weaker than the first hex nut 24 and the second hex nut 26. By use of the term "weaker" it is contemplated that at least a portion of the shearable shaft element 28 may be sheared through the exertion of force on the shearable shaft element 28, either directly or indirectly, while at the same time, the same level of exertion will not damage either the first hex nut 24 or the second hex nut 26. Desirably, the shearable shaft element 28 is designed to shear at a point adjacent to or abutting the first hex nut 24, but it may be sheared at any desired location.

The first hex nut 24, second hex nut 26 and the shearable shaft element 28 may be formed together as one unitary piece or they may each be formed separately and subsequently attached before use. Further, the first hex nut 24 and shearable shaft element 28 may be formed together and subsequently attached to second hex nut 26 before use, or the shearable shaft element 28 and second hex nut 26 may be formed together and subsequently attached to the first hex nut 24 before use.

In one preferred embodiment, the shearable shaft element 28 may be sheared through application of a desired level of torque on the second hex nut 26. Thus, in application, when torque is applied to the second hex nut 26 by the user, the entire assembly, including the second hex nut 26, the shearable shaft element 28, the first hex nut 24, and the insulated plug 20, is turned in the desired direction, i.e., so that the assembly is threaded onto the bushing insert. When the insulated plug 20 and the first hex nut 24 can no longer be turned, i.e., when the insulated plug 20 has been fully inserted into a joint elbow, continuing to exert torque on the shearable shaft element 28 and/or the second hex nut 26 will result in a higher level of force being applied to the shearable shaft element 28. When a desired level of force is applied to the shearable shaft element 28, the shearable shaft element 28 will break, thus separating at least a portion of itself (and the second hex nut 26 attached thereto) from the first hex nut 24. After shearing, the insulated plug 20 remains attached to the first hex nut 24, but at least a portion of the shearable shaft element 28 and the second hex nut 26 may be removed.

As explained above, the shearable shaft element 28 may be designed to shear at any desired level of torque. Any means to promote shearing may be used, including using a weaker material for the shearable shaft element 28, incorporating a groove or undercut circumferentially around a portion of the shearable shaft element 28, or simply using a shearable shaft element 28 that is structurally thin at the location of shearing. The desired level of torque required to separate the shearable shaft element 28 is preferably equal to or greater than the level of torque required for full insertion of the insulated plug 20 into a joint elbow. Thus, when the appropriate level of insertion of the insulated plug 20 into the joint elbow has been reached, exertion of more or continued torque will break the shearable shaft element 28. Generally, the proper level of torque for fully securing the insulated plug 20 into the joint elbow is between about 30-90 foot pounds, and generally 50-60 foot pounds, but any desired level of torque may be used if desired. Once the shearable shaft element 28 and second hex nut 26 have been removed, the user may be assured that the insulated plug 20 has been appropriately inserted into the joint elbow at the proper level of insertion. Thus, the user does not have to guess whether he or she has applied the proper level of torque, and the use of a torque wrench is rendered unnecessary.

Figure 3:
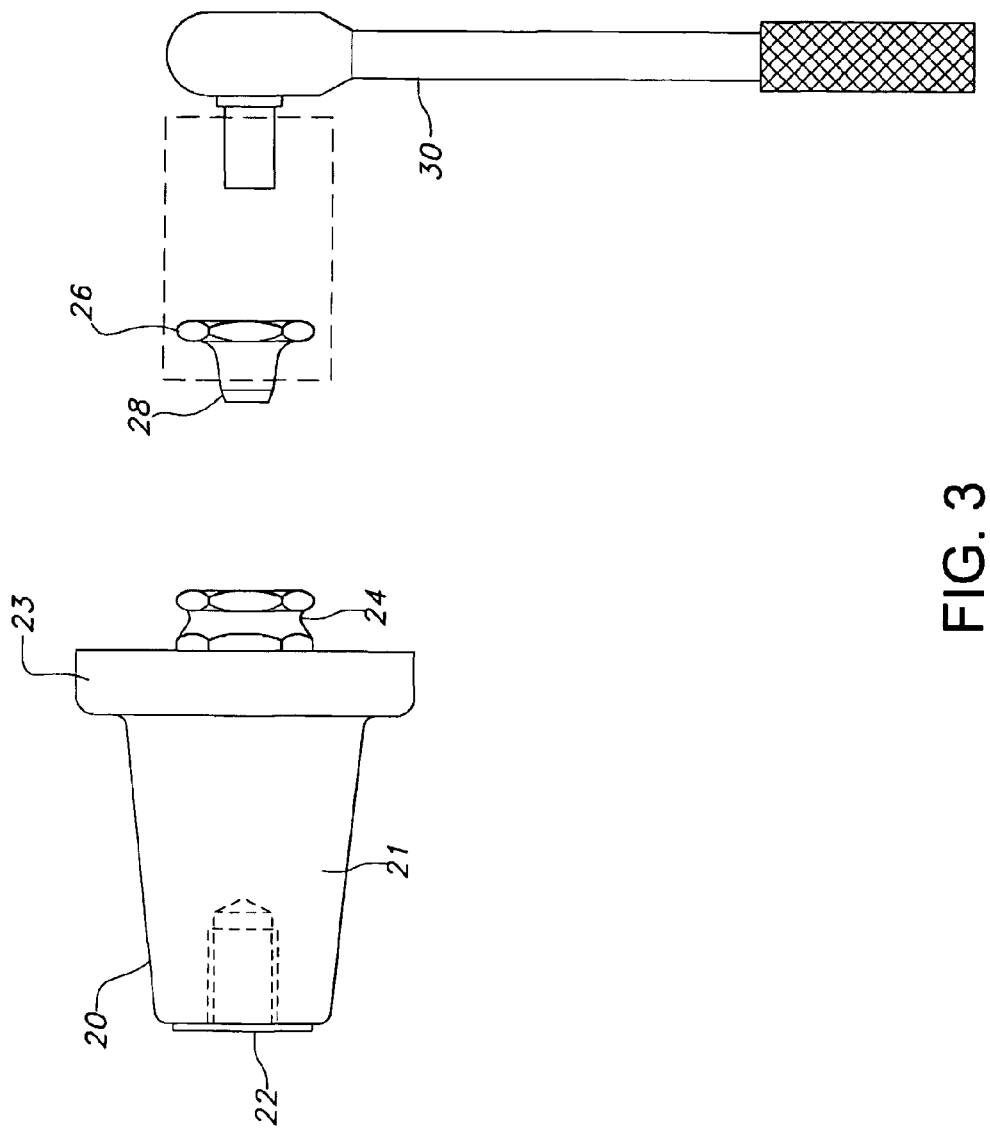
FIG. 3 is a drawing of the use of an insulated plug of the present invention with a standard wrench.

FIG. 3 shows the separation of the shearable shaft element 28 through use of a standard wrench 30. The user inserts the head of the second hex nut 26 into the standard wrench 30. The user then turns the standard wrench 30, exerting a level of torque onto the entire assembly. After exerting the desired level of torque as explained above, the shearable shaft element 28 is sheared, separating at least a portion of it and the associated second hex nut 26 from the first hex nut 24.

Figure 4:
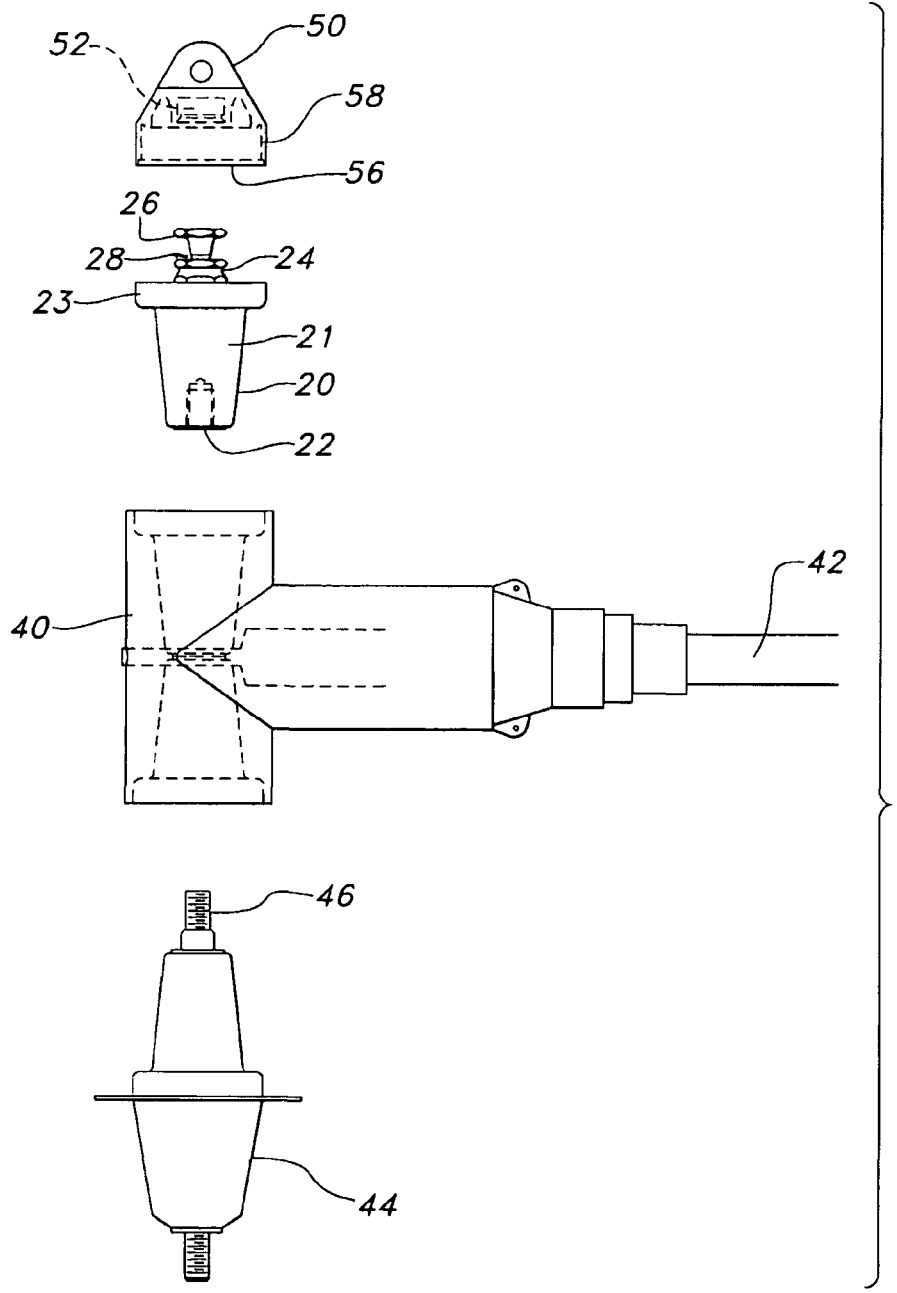
FIG. 4 depicts a loadbreak connector, using the insulated plug of the present invention.

FIG. 4 shows the attachment of an insulated plug 20 of the present invention into a joint elbow 40. As can be seen, a cable 42 may be fed into a joint elbow 40, where it may be joined with a transformer bushing 44. The insulated plug 20, the cable 42 and the transformer bushing 44 all meet at the joint elbow 40. An insert 46 of the transformer bushing 44 is inserted into the opening 22 of the insulated plug 20. The insert 46 may be threaded for secure attachment into the threaded opening 22. The insulated plug 20 may then be threaded into the joint elbow 40 through application of torque on the second hex nut 26 as described above. Once the second hex nut 26 is separated from the first hex nut 24 through shearing of the shearable element 28, the user is aware that the insulated plug 20 has been properly inserted into the joint elbow 40.

Optionally, the assembly may include a BIP cap 50, which may be attached to the top of the insulated plug 20 for protection and to provide cover. The BIP cap 50 may be made of any desired material but preferably an electric semi conductive material, including plastic or rubber or combinations thereof. The BIP cap 50 is desirably open at its bottom end 56 such that a portion of the outer area of the insulated plug 20, particularly the end extent 23, may be snugly fit into the BIP cap 50. Extending circumferentially down from the open bottom end 56 is an annular skirt 58, which is sized to receive the end extent 23 of the insulated plug 20.

The BIP cap 50 may include an open hex accommodating chamber 52, into which the hex head of the first hex nut 24 of the insulated plug 20 may be inserted, providing adequate and secure attachment of the BIP cap 50 to the insulated plug 20. The open hex accommodating chamber 52 is accessible through the open bottom end 56. The open hex accommodating chamber 52 is defined by a downwardly extending wall or series of walls 54, which is shaped and sized to receive the head of the first hex nut 24 of the insulated plug 20 for attachment thereto. The walls 54 may include at least one inwardly directed resilient member for releasably engaging the head of the first hex nut 24. The first hex nut 24 is preferably snugly fit into the open hex accommodating chamber 52, providing a secure attachment of the BIP cap 50 to the insulated plug 20. The first hex nut 24 and open hex accommodating chamber 52 may be connected via a snap fit or other similar connecting means. Thus, as can be seen, BIP cap 50 can not be properly installed should second hex nut 26 still be attached.

Thus, when fully assembled, the cable 42, the transformer bushing 44 and the insulated plug 20 are attached to the joint elbow 40. There may be other openings in the joint elbow 40, if desired. For example, a second cable (not shown) may be inserted into the joint elbow 40 at a fourth opening. As can be seen in FIG. 5B, the optional BIP cap 50 may be attached to the top of the insulated plug 20.

In an alternate embodiment, the second hex nut 26 may be a different size than the first hex nut 24, i.e., the head of the second hex nut 26 may have a larger or smaller cross section than the head of the first hex nut 24. In this embodiment, the open hex accommodating chamber 52 of the BIP cap 50 may be appropriately sized to receive only the head of the first hex nut 24. Thus, the different-sized head of the second hex nut 26 will be either too large or too small to properly and snugly fit into the open hex accommodating chamber 52. In this embodiment, if the second hex nut 26 has not been removed from the insulated plug 20, the BIP cap 50 will not adequately fit onto the insulated plug 20. The inadequate fit will alert the user to remove the second hex nut 26 to ensure a proper fit, thus requiring the user to apply the adequate level of torque to the second hex nut 26 as described above. Again, application of the proper level of torque to the assembly ensures a secure fit of the insulated plug 20 into the joint elbow 40.

Figure 5A:
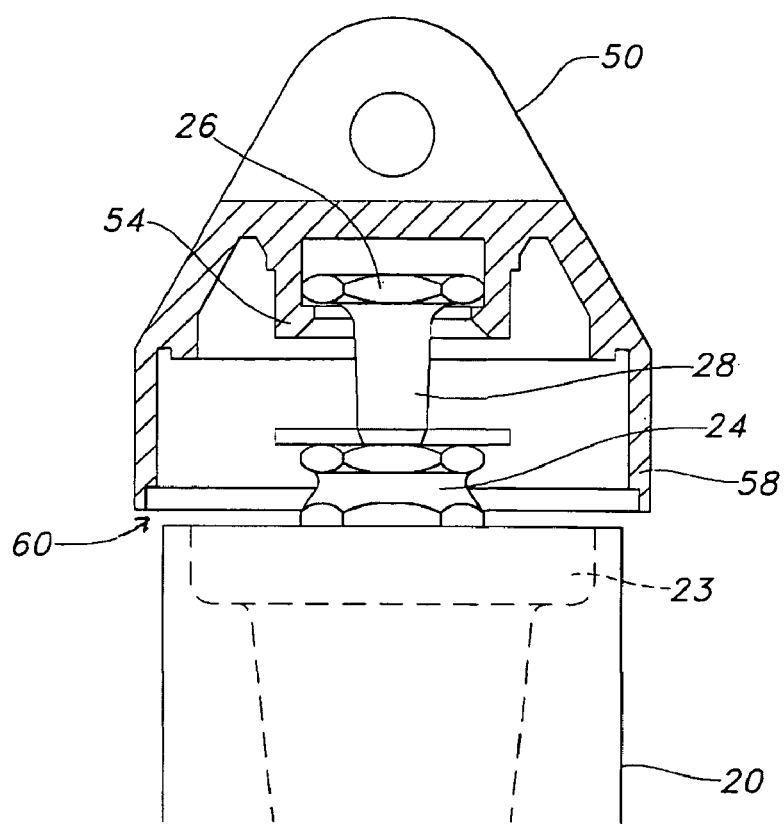
FIGS. 5A and 5B depict the use of an insulated plug of the present invention incorporating a BIP cap.
Figure 5B:
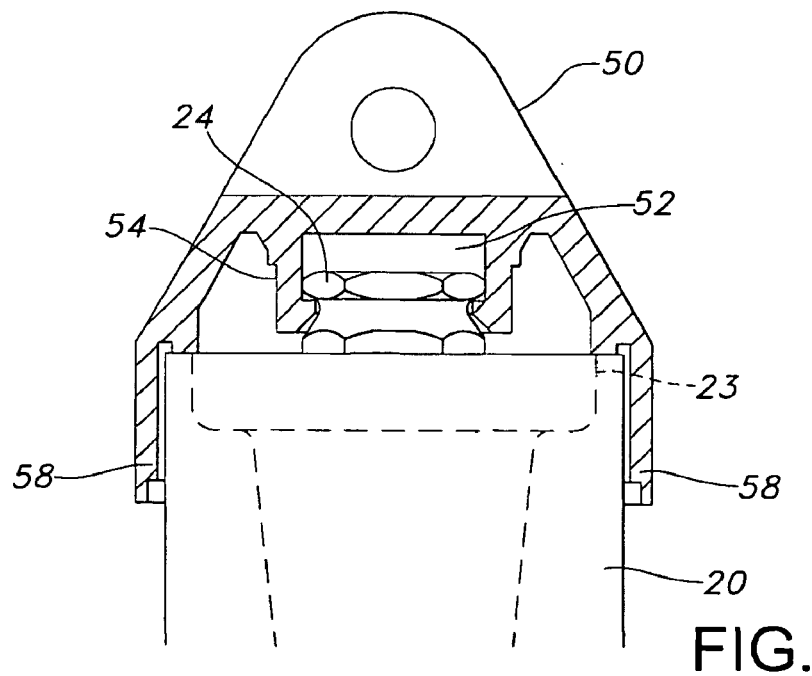

With reference to FIGS. 5A and 5B, the assembly may include use of an elongated shearable shaft element 28. Optionally, the second hex nut 26 may be attached to the first hex nut 24 through an elongated shearable shaft element 28. The use of an elongated shearable shaft element 28 may be especially useful when attaching a BIP cap 50 to the insulated plug 20. The BIP cap 50 includes an open hex accommodating chamber 52, which is designed to receive the head of the first hex nut 24. However, a user may mistakenly attempt to attach the BIP cap 50 to the insulated plug 20 before second hex nut 26 has been removed. In this situation, the user has not properly attached the insulated plug 20 with the correct level of torque. Use of an elongated shearable shaft element 28 may alert the user that the second hex nut 26 has not been removed, and the user must remove it for proper assembly.

As can be seen in FIG. 5A, the annular skirt 58 extending from the BIP cap 50 is sized to an appropriate length such that if the elongated shearable shaft element 28 (and associated second hex nut 26) is still attached to the first hex nut 24, the annular skirt 58 of the BIP cap 50 will not reach the end extent 23 of the insulated plug 20. In this fashion, there is a noticeable gap 60 between the end of the annular skirt 58 and the end extent 23 of the insulated plug 20. Such gap 60 is easily recognized by the user as undesirable; alerting the user to the fact that the BIP cap 50 is not adequately attached. Thus, the user would be directed to remove the second hex nut 26 by shearing the elongated shearable shaft element 28. Once the shearable shaft element 28 and second hex nut 26 have been removed, the BIP cap 50 may snugly fit over the insulated plug 20.

As can be seen in FIG. 5B, after removal of the second hex nut 26 and shearable shaft element 28, the open hex accommodating chamber 52 in the BIP cap 50 may receive the first hex nut 24. In this fashion, the annular skirt 58 overlaps at least a portion of the insulated plug 20. Preferably, the annular skirt 58 overlaps the end extent 23. Thus, there is no gap 60 between the annular skirt 58 and the end extent 23 of the insulated plug 20 once the shearable shaft element 28 has been removed.

Figure 6:
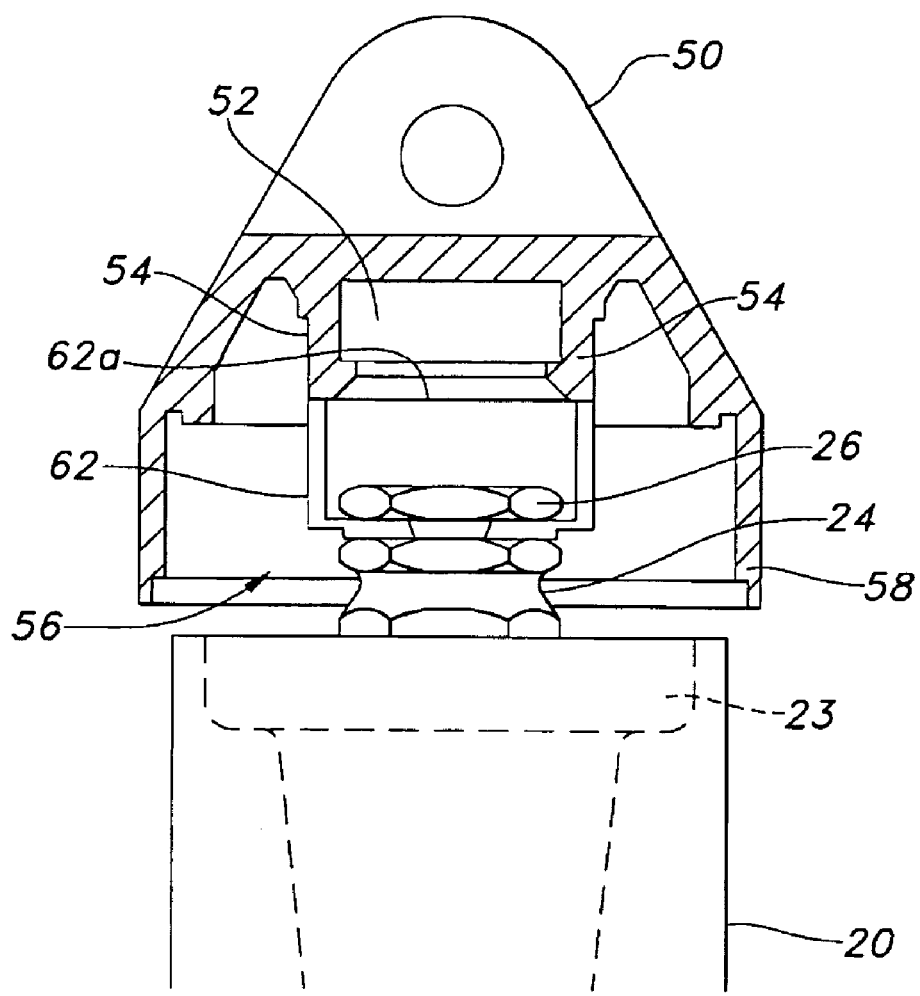
FIG. 6 depicts one embodiment of the insulated plug of the present invention, incorporating a BIP cap.

With reference to FIG. 6, insulated plug 10 may optionally incorporate a cover or cup 62 disposed over the head of the second hex nut 26. The cup 62 is preferably cylindrical, but may be any shape desired, including hex-shaped. The cup 62 is sized to surround at least a portion of the second hex nut 26, and thus has a larger cross-section than the head of the second hex nut 26. In this embodiment, the cup 62 is too large to appropriately fit in the open hex accommodating chamber 52 of the BIP cap 50. Again, this would alert the user to the fact that the second hex nut 26 has not been removed, prompting him or her to apply the proper level of torque to the assembly. The cup 62 may be attached to the second hex nut 26 or it may be attached to the shearable shaft element 28. Desirably, the cup 62 cannot be removed from the assembly until the second hex nut 26 is removed. In that regard, the second hex nut 26 is accessible through the open upper end 62a of the cup 62 so that it can be sheared from first hex nut 24. This results in the cup 62 being removable so that BIP cap 50 may be properly seated.

What is claimed is:

1. A plug assembly comprising:
    an insulative plug body having an end extent;
    a first hex nut extending from said end extent of said plug body;
    a second hex nut extending from said first hex nut and removably shearable therefrom upon application of torque thereto in excess of a given value; and
    a cap seatably attached to said plug body and covering said end extent upon said removal of said second hex nut from said first hex nut.

2. A plug assembly of claim 1, wherein said cap includes a hex nut accommodating chamber and an annular skirt radially outwardly therearound, said chamber accommodating said first hex nut therein and said skirt surrounding said end extent of said plug body upon said removal of said second hex nut from said first hex nut.

3. A plug assembly of claim 2, wherein said chamber includes chamber walls engagable with a hex head of said first hex nut.

4. A plug assembly of claim 3 wherein said chamber walls include an inwardly directed resilient male for releasably engaging said hex head and said first hex nut.

5. A plug assembly of claim 3, wherein said cap includes an opening formed therein for removing said cap from said plug.

6. A plug assembly of claim 3, wherein said second hex nut includes an elongate shaft attached to one end of said hex head of said first hex nut and a second hex head at the opposite end thereof.

7. A plug assembly of claim 6, wherein said shaft of said second hex nut is shearable at a location adjacent said hex head of said first hex nut.

8. A plug assembly of claim 1, further comprising a cup surrounding at least a portion of said second hex nut.

9. A plug assembly of claim 8, wherein said cup is removable upon removal of said second hex nut from said first hex nut.

\* \* \* \* \*